(12) United States Patent
Nishihara

(10) Patent No.: US 7,226,974 B2
(45) Date of Patent: Jun. 5, 2007

(54) OLEFINIC RUBBER COMPOSITION

(75) Inventor: Hajime Nishihara, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 29 days.

(21) Appl. No.: 10/382,573

(22) Filed: Mar. 7, 2003

(65) Prior Publication Data

US 2004/0176540 A1 Sep. 9, 2004

(51) Int. Cl.
C08L 23/04 (2006.01)
C08L 23/08 (2006.01)
C08L 23/12 (2006.01)
C08L 23/14 (2006.01)
C08L 25/02 (2006.01)

(52) U.S. Cl. ............... 525/191; 525/232; 525/240; 525/241

(58) Field of Classification Search ........... 525/191, 525/232, 240, 241
See application file for complete search history.

(56) References Cited

U.S. PATENT DOCUMENTS 6,417,271 B1 * 7/2002 Nishihara et al. ........... 525/105
6,506,839 B1 * 1/2003 Nishihara et al. ........... 525/191

* cited by examiner

*Primary Examiner*—Nathan M. Nutter
(74) *Attorney, Agent, or Firm*—Birch, Stewart, Kolasch & Birch, LLP

(57) ABSTRACT

A vulcanized thermoplastic olefinic rubber composition comprising at least one vulcanizable rubber (A) selected from the group consisting of ethylene-α-olefin copolymers, which contain an ethylene unit and a unit of an α-olefin having 3 to 20 carbon atoms, and which are produced with use of a metallocene catalyst, and an olefinic resin (B), wherein X and Y as defined below of said (A) are from 1 to 40% and from 0.02 to 0.5, respectively, $X = (W2/W0) \times 100 (\%)$ $Y = W2/W1$ wherein W1 is a weight of a swollen vulcanized rubber (A), which is obtained when (A) in an amount of W0 is extracted with hot xylene, and W2 is a weight measured after drying of the above-mentioned swollen vulcanized rubber (A).

7 Claims, No Drawings

OLEFINIC RUBBER COMPOSITION

CROSS-REFERENCE TO RELATED APPLICATION

This application is based on JP-A 2000-69252 (filed Aug. 28, 2000) and further related to the following applications, and not only the fundamental concepts of these applied inventions and preferred embodiments thereof but also all disclosure therein are incorporated by reference in the present specification:

U.S. Pat. No. 6,087,431, JP-A-2001-261901, WO 00/161662, WO 00/161681, JP-A-2002-121329 (U.S. application Ser. No. 689,608), WO 01/148079 A1, JP-A-2001-342302, JP-A-2001-226524, JP-A-2002-179879, JP-A-2002-167472 and JP-A-2002-69252.

BACKGROUND OF THE INVENTION (1) Field of the Invention

The present invention relates to an olefinic rubber composition. More specifically, the present invention relates to a thermoplastic olefinic rubber composition, which is superior in appearance, oil resistance, mechanical strength and vacuum-forming moldability.

(2) Description of the Related Art

A thermoplastic elastomer composition obtained by so-called dynamic vulcanization is already known in the art, and extensively applied for uses such as car parts. According to the dynamic vulcanization, a rubber like polymer such as a radical vulcanizable olefinic elastomer and a non-radical vulcanizable olefinic resin such as polypropylene (PP) are vulcanized with each other through melt-kneading in the presence of a radical initiator in an extruder.

As such an olefin elastomer, ethylene-propylene-non-conjugated diene rubber (EPDM) and a thermoplastic elastomer composition produced with use of a metallocene catalyst (JP-A-8-120127 and JP-A-9-137001) are known. However, the above-mentioned compositions are high in their cross-linking level, and therefore the compositions are not always sufficient in appearance and vacuum-forming moldability in spite of superiority in their mechanical strength and oil resistance. Further, a rheology-modified thermoplastic elastomer composition obtained by vulcanization an ethylene-α-olefin copolymer and a high melting polymer with the aid of a peroxide is disclosed (WO98/32795). However, the composition is low in its cross-linking level, and therefore the composition is inferior in mechanical strength and oil resistance in spite of superiority in its appearance. Accordingly, a thermoplastic olefinic rubber composition sufficient to practical application has been desired.

SUMMARY OF THE INVENTION

Under these circumstances, an object of the present invention is to provide a thermoplastic olefinic rubber composition, which is freed from the problems as mentioned above, and superior in its appearance, oil resistance, mechanical strength and vacuum-forming moldability.

The present inventors have undertaken extensive studies to obtain a rubber composition superior in its mechanical strength and vacuum-forming moldability. As a result, surprising is finding that when a rubber composition has a specific cross-linking structure, not only its mechanical strength and vacuum-forming moldability but also its appearance and oil resistance can be far improved. Thereby, the present invention has been accomplished.

That is, the present invention provides a vulcanized thermoplastic olefinic rubber composition comprising at least one vulcanizable rubber (A) selected from the group consisting of ethylene-α-olefin copolymers, which contain an ethylene unit and a unit of an α-olefin having 3 to 20 carbon atoms, and which are produced with use of a metallocene catalyst, and an olefinic resin (B), wherein X and Y as defined below of said (A) are from 1 to 40% and from 0.02 to 0.5, respectively, $$X = (W2/W0) \times 100(\%)$$

$$Y = W2/W1$$

wherein W1 is a weight of a swollen vulcanized rubber (A), which is obtained when (A) in an amount of W0 is extracted with hot xylene, and W2 is a weight measured after drying of the above-mentioned swollen vulcanized rubber (A).

The thermoplastic olefinic rubber composition in accordance with the present invention is superior in appearance, oil resistance, mechanical strength and vacuum-forming moldability. The composition can be extensively applied for various uses such as car parts, car interior materials, air-bag covers, machine parts, electrical parts, cables, hoses, belts, toys, miscellaneous goods, daily necessaries, building materials, sheets and films, and the role that the composition plays in industry is significant.

PREFERRED EMBODIMENT OF THE INVENTION

The composition in accordance with the present invention comprises a vulcanizable rubber (A) having a specific cross-linking structure and an olefinic resin (B).

Herein, X of (A) means an index of a cross-linking degree, and it is important that X is from 1 to 40%. Preferably, X ranges from 10 to 40%, and more preferably X ranges from 10 to 30%. When X is less than the above-mentioned lower limit, a melt viscosity is low, and not only drawing property in extrusion processing deteriorates, but also the mechanical strength and the oil resistance decrease. On the other hand, when X exceeds 40%, not only the appearance deteriorates, but also the vacuum-forming moldability markedly loses because of lowering of melt elongation.

Further, Y of (A) means an index of a cross-linking density, and it is important that Y is from 0.02 to 0.5. Preferable is from 0.02 to 0.4, more preferable is from 0.02 to 0.3, and the most preferable is from 0.02 to 0.2. When Y is within the above-defined range, both the oil resistance and the mechanical strength are superior.

There is an antinomic relation between the appearance and vacuum-forming moldability and the oil resistance and mechanical strength. Technical restrictions have greatly prevented improvement of moldability and the like merely by controlling the cross-linking degree X, which is the conventional index of the rubber cross-linking structure. However, the following has been found. When the cross-linking density Y, which is another index of the rubber cross-linking structure, is within the above-defined range, provided that X is within a lower region, the appearance and vacuum-forming moldability and the oil resistance and mechanical strength can be satisfied at the same time. Thereby, the present invention has been accomplished.

Respective components used in the present invention are explained in detail as follows.

Component (A)

In the present invention, it is preferred that the vulcanizable rubber (A) has a glass transition temperature (Tg) of not higher than −10° C.

Further, Mooney viscosity (ML) of (A) measured at 100° C. according to ISO 289-1985 (E) is preferably from 20 to 150, and more preferably from 50 to 120.

In the present invention, among the vulcanizable rubber (A), one of preferred copolymers is an ethylene-α-olefin copolymer. For example, copolymers of ethylene and an α-olefin having 3 to 20 carbon atoms are preferred. Copolymers of ethylene and an α-olefin having 3 to 12 carbon atoms are more preferred. Examples of the α-olefin are propylene, butene-1, pentene-1, hexene-1, 4-methylpentene-1, heptene-1, octene-1, nonene-1, decene-1, undecene-1 and dodecene-1. Of these, propylene, butene-1, hexene-1, 4-methylpentene-1 and octene-1 are preferred. Particularly, propylene, butene-1 and octene-1 are the most preferred. If desired, (A) may contain a unit of a monomer having more than one unsaturated bond. Preferred examples thereof are conjugated diolefins such as butadiene and isoprene, non-conjugated diolefins such as 1,4-hexadiene, cyclic diene compounds such as dicyclopentadiene and norbornene derivatives, and acetylenes. Particularly, ethylidenenorbornene (ENB) and dicyclopentadiene (DCP) are the most preferred.

In the present invention, it is preferred that the ethylene-α-olefin copolymer is produced with use of a conventional metallocene catalyst.

Generally speaking, the metallocene catalyst comprises a complex of a IV group metal such as titanium and zirconium with a cyclopentadienyl derivative and a co-catalyst, and has a high activity as a polymerization catalyst. Moreover, as compared with a Ziegler catalyst, a molecular weight distribution of the polymer obtained is narrower and a distribution of the α-olefin having 3 to 20 carbon atoms, which is a comonomer in said copolymer, is more uniform.

The ethylene-α-olefin copolymer used in the present invention has an α-olefin copolymerization proportion of preferably from 1 to 60% by weight, more preferably from 10 to 50% by weight, and the most preferably from 20 to 45% by weight. When the α-olefin copolymerization proportion exceeds 60% by weight, hardness of the composition and tensile strength thereof markedly decrease. On the other hand, when it is less than 1% by weight, flexibility and mechanical strength decrease.

It is preferred that density of the ethylene-α-olefin copolymer ranges from 0.8 to 0.9 g/cm$^3$. By using such an olefin elastomer having a density within said range, a rubber composition having superior flexibility and low hardness can be obtained.

Further, it is desirable that the ethylene-α-olefin copolymer used in the present invention has a long branched chain. Owing to the presence of the long branched chain, it becomes possible to further lessen a density for the α-olefin copolymerization proportion (% by weight) without detriment to the mechanical strength, and thereby, a rubber composition having low density, low hardness and high strength can be obtained. Examples of the olefin elastomer having a long branched chain are described in, for example, U.S. Pat. No. 5,278,272.

Still further, it is desirable that the ethylene-α-olefin copolymer has a melting point peak in DSC in a region of a temperature not lower than ambient temperature. When such a melting point peak exists, a stable state can be attained within a temperature range not higher than the melting point, and as a result superior handling and little stickiness can be attained.

Additionally, it is preferred that the ethylene-α-olefin copolymer has a melt index of from 0.01 to 100 g/10 min (190° C., 2.16 kgf (0.212 Pa)). More preferable is from 0.2 to 10 g/10 min. It is not desirable that the melt index exceeds 100 g/10 min, because cross-linking of the composition becomes insufficient. It is not desirable that it is less than 0.01 g/10 min, because flowability is not good and processability decreases.

In the present invention, as the vulcanizable rubber like polymer (A) used in the present invention, several kinds thereof may be used in combination. In such a case, it is possible to further improve the processability.

In the present invention, it is preferred that a content of a polymer having a molecular weight of not more than 150,000 calibrated with polystyrene standard is not more than 30% in (A). More preferable is not more than 25%, much more preferable is not more than 20%, most preferable is not more than 15%, and extremely preferable is not more than 10%. When the content is not more than 30%, the cross-linking markedly increases to improve mechanical strength, appearance, feeling, abrasion resistance and oil resistance.

In the present invention, as a process for controlling the content of a polymer having a molecular weight of not more than 150,000 calibrated with polystyrene standard in (A), for example, there are mentioned a process wherein the whole molecular weight is increased, so that a portion having a molecular weight of not more than 150,000 may be made not more than 30%, a process wherein the portion having a molecular weight of not more than 150,000 is removed through an operation such as extraction, and a process wherein polymerization is selectively carried out with use of a polymerization catalyst so as not to produce the portion having a molecular weight of not more than 150,000.

Component (B)

In the present invention, the olefinic resin (B) is a homopolymer or copolymer containing one or more of ethylene and/or α-olefin having 2 to 20 carbon atoms, such as ethylene resins and propylene resins. Particularly preferred are propylene resins.

Specific examples of the propylene resins used the most suitably in the present invention are isotactic propylene homopolymers and isotactic copolymer resins (including block and random ones) formed from propylene and other α-olefins such as ethylene, butene-1, pentene-1 and hexene-1.

In the present invention, a propylene random copolymer resin such as a random copolymer resin of ethylene and propylene, which is a cross-linking olefinic resin (B-1), and a combination of said (B-1) and either a propylene block copolymer resin or a homopolypropylene resin, which is a decomposing olefinic resin (B-2) are preferred as (B). When two kinds of such olefinic resins, namely the cross-linking olefinic resin and the decomposing olefinic resin are used in combination, the appearance and mechanical strength can be further improved.

As an example of (B-1), a random copolymer resin of ethylene and propylene is enumerated. In the case where an ethylene component exists in the main chain of the polymer, the cross-linking occurs at such a cross-linking point, and as a result, the characteristic features of the cross-linking olefinic resin can be exhibited.

In (B-2), an α-olefin other than ethylene is the main component, and it is preferred that the main chain of the polymer contains no ethylene unit. However, in the case where the ethylene-α-olefin copolymer exists as a dispersed phase like the propylene block copolymer resin, characteristic features of the decomposing olefinic resin can be exhibited.

It is permitted that (B) is a mixture of several numbers of (B-1) and/or (B-2) component.

The α-olefin random copolymer resin comprising propylene as the main constituent, which is the most preferable among (B), can be produced according to a high pressure method, a slurry method, a gas phase method, a bulk method or a solution method. As a polymerization catalyst, a Ziegler-Natta catalyst and a metallocene catalyst are preferred. Particularly when the composition distribution and molecular weight distribution are required to be narrow, it is recommendable to carry out a random copolymerization using a metallocene catalyst.

A specific example of a process for producing the random copolymer resin is disclosed in European Patent Publication No. 0969043A1 and U.S. Pat. No. 5,198,401. According to the process, liquefied propylene is introduced into a reactor equipped with a stirrer, thereafter a catalyst is added to a gas phase or a liquid phase through a nozzle. Successively, an ethylene gas or an α-olefin is introduced into the gas phase or the liquid phase in the reactor, and reaction temperature and reaction pressure are controlled under such conditions that propylene is refluxed. A polymerization rate is controlled by a catalyst concentration and reaction temperature, and a copolymerization composition is controlled by an amount of ethylene or the α-olefin added.

A melt index of the olefinic resin (B) suitably used in the present invention is preferably within a range of from 0.1 to 100 g/10 min (230° C., 2.16 kgf (0.212 Pa)). It is not desirable that it exceeds 100 g/10 min, because heat resistance and mechanical strength of the rubber composition become insufficient. It is not desirable that it is less than 0.1 g/10 min, because flowability becomes inferior and molding processability decreases.

In the present invention, a content of (A) in 100 parts by weight of the rubber composition of (A) and (B) is preferably from 1 to 99% by weight, more preferably from 10 to 90% by weight, and the most preferably from 20 to 80% by weight. It is not preferred that the (A) component is less than 1% by weight, because the composition is insufficient in its mechanical strength and flexibility. It is not preferred that the component (A) exceeds 99% by weight, because the composition is lessened in its thermoplastic property.

Component (C)

It is preferred that the composition in accordance with the present invention is vulcanized with the aid of a cross-linking agent (C). Said (C) contains a cross-linking initiator (C-1) as the essential component, and further, if desired, a polyfunctional monomer (C-2) and a monofunctional monomer (C-3). The above-mentioned (C) is used in an amount of from 0.001 to 10 parts by weight, and preferably from 0.005 to 3 parts by weight, based on 100 parts by weight of (A) and (B). When it is less than 0.001 part by weight, cross-linking is apt to be insufficient, and when it exceeds 10 parts by weight, the appearance and mechanical strength of the composition are apt to decrease.

Here, the cross-linking initiator (C-1) includes a radical initiator such as an organic peroxide and an organic azo compound. Specific examples thereof are peroxy ketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane and n-butyl-4,4-bis(t-butylperoxy)valerate; dialkyl peroxides such as di-t-butyl peroxide, dicumyl peroxide, t-butylcumyl peroxide, α, α'-bis(t-butylperoxy-m-isopropyl)benzene, α, α'-bis(t-butylperoxy)diisopropylbenzene, 2,5-dimethyl-2,5-bis(t-butylperoxy)hexane and 2,5-dimethyl-2,5-bis(t-butylperoxy)hexyne-3; diacyl peroxides such as acetyl peroxide, isobutylyl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-toluoyl peroxide; peroxy esters such as t-butylperoxy acetate, t-butylperoxy isobutylate, t-butylperoxy-2-ethylhexanoate, t-butylperoxy laurate, t-butylperoxy benzoate, di-t-butylperoxy isophthalate, 2,5-dimethyl-2,5-di(benzoylperoxy)hexane, t-butylperoxy maleate, t-butylperoxy isopropylcarbonate and cumylperoxy octate; and hydroperoxides such as t-butyl hydroperoxide, cumene hydroperoxide, diisopropylbenzene hydroperoxide, 2,5-dimethylhexane-2,5-dihydroperoxide and 1,1,3,3-tetramethylbutyl peroxide.

Among these compounds, preferred are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3.

The above-mentioned (C-1) is used in an amount of preferably from 1 to 80% by weight, and more preferably from 10 to 50% by weight in the (C) component. When it is less than 1% by weight, vulcanization is insufficient, and when it exceeds 80% by weight, the mechanical strength decreases.

In the present invention, it is preferred that the polyfunctional monomer (C-2), which is one component in the cross-linking agent (C), has a functional group having radical polymerization ability as the functional group. It is particularly preferred that it has a vinyl group. The number of the functional group is 2 or more. It is also effective that it has 3 or more functional groups particularly when used in combination with the monofunctional monomer (C-3). Specific examples thereof are, as preferably used ones, divinylbenzene, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinone dioxime, p,p'-dibenzoylquinone dioxime, phenylmaleimide, allyl methacrylate, N,N'-m-phenylenebismaleimide, diallyl phthalate, tetraallyl oxyethane and 1,2-polybutadiene. Particularly, triallyl isocyanurate is preferred. It is permitted to use more than one polyfunctional monomer in combination.

The above-mentioned (C-2) is used in an amount of preferably from 1 to 80% by weight, and more preferably from 10 to 50% by weight in the (C) component. When it is less than 1% by weight, vulcanization is insufficient, and when it exceeds 80% by weight, the mechanical strength decreases.

The monofunctional monomer (C-3) used in the present invention is a vinyl monomer, which is added for the purpose of controlling a cross-linking rate. Preferred is a vinyl monomer having radical polymerization ability. Examples thereof are aromatic vinyl monomers, unsaturated nitrile monomers such as acrylonitrile and methacrylonitrile, ester monomers such as an acrylic acid ester monomer and a methacrylic acid ester monomer, unsaturated carboxylic acid monomers such as an acrylic acid monomer and a methacrylic acid monomer, unsaturated carboxylic acid anhydrides such as a maleic anhydride monomer, and N-substituted maleimide monomers.

The above-mentioned (C-3) is used in an amount of preferably from 1 to 80% by weight, and more preferably from 10 to 50% by weight in the (C) component. When it is less than 1% by weight, vulcanization is insufficient, and when it exceeds 80% by weight, the mechanical strength decreases.

In the present invention, the most preferred combination to prepare the cross-linking agent (C) is a combination of 2,5-dimethyl-2,5-bis(t-butylperoxy)hexane (a commercial name of Perhexa 25B) manufactured by NOF Corporation or 2,5-dimethyl-2,5-bis(t-butylperoxy)hexyn-3 manufactured by NOF Corporation as the cross-linking initiator, and triallyl isocyanurate (TAIC) manufactured by Nippon Kasei Chemical Industry Co., Ltd. as the polyfunctional monomer, because of superior mechanical strength and superior retention of a component (D), if any, as mentioned below.

Component (D)

As a softening agent (D), preferred are process oil comprising paraffin, naphthenic or aromatic hydrocarbons. Particularly preferred are process oil comprising paraffin hydrocarbons as the main constituent. From a viewpoint of compatibility with rubber, process oil comprising naphthenic hydrocarbons as the main constituent are preferred. From a viewpoint of heat and light stability, a content of the aromatic hydrocarbons in the process oil is preferably not more than 10%, more preferably not more than 5%, and the most preferably not more than 1%, in terms of a carbon number ratio as prescribed in ASTM D2140-97.

The component (D) can be used for controlling hardness and flexibility of the composition in an amount of from 5 to 500 parts by weight, and preferably from 10 to 150 parts by weight, based on 100 parts by weight of (A) and (B). It is not desired that the amount is less than 5 parts by weight, because flexibility and processability become insufficient, and it is not desired that it exceeds 500 parts by weight, because oil bleeding becomes remarkable.

Component (E)

In the present invention, a thermoplastic resin (E) other than (B) may be blended. (E) is not particularly limited as far as it is dispersible in either (A) or (B). Examples thereof are polystyrene, polyphenylene ether, polyvinyl chloride, polyamide, polyester, polyphenylene sulfide, polycarbonate and polymethacrylate thermoplastic resins, which may be used singly or in combination of two or more.

In the present invention, it is preferred that a content of (E) is from 1 to 99 parts by weight based on 100 parts by weight of the rubber composition of (A) and (B). More preferable is from 10 to 90 parts by weight based thereon, and the most preferable is from 20 to 80 parts by weight based thereon.

In the present invention, when abrasion resistance is required, a polyorganosiloxane having a kinematic viscosity of not less than 5000 centistoke (CS) ($5 \times 10^{-3}$ $m^2$/sec) at 25° C. measured according to JIS-K2410 may be added, when necessary.

The above-mentioned polyorganosiloxane is not particularly limited as far as it is viscous like starch syrup or gum and is a polymer having an alkyl, vinyl and/or allyl group-substituted siloxane unit. Of these, the most preferred is polydimethylsiloxane.

The kinematic viscosity (25° C.) of the polyorganosiloxane arbitrarily used in the present invention is not less than 5,000 cs ($5 \times 10^{-3}$ $m^2$/sec), preferably from not less than 10,000 cs ($1 \times 10^{-2}$ $m^2$/sec) to less than 10,000,000 cs (10 $m^2$/sec), and the most preferably from not less than 50,000 $m^2$/sec) to less than 2,000,000 cs (2 $m^2$/sec).

In the present invention, the polyorganosiloxane is added in an amount of preferably from 0.01 to 20 parts by weight based on 100 parts by weight of the sum of (A) and (B). More preferable is from 0.1 to 10 parts by weight based thereon, and the most preferable is from 0.5 to 5 parts by weight based thereon.

When the composition in accordance with the present invention is the one which comprises the vulcanizable rubber like polymer (A) and the olefinic resin (B) and is required to have high temperature rubber characteristics such as high temperature compression permanent strain and high temperature mechanical strength, it is necessary to control crystallinity of (B) in said composition. It is preferred that crystallization temperature and crystallization calorie of (B) measured according to differential scanning calorimetry (DSC) as defined below are within a range of from 110 to 150° C., and a range of from 30 to 200 J/g, respectively.

<Crystallization Temperature and Crystallization Calorie of (B) in the Composition>

Differential scanning calorimetry (DSC) was used for the measurement thereof. More specifically, using a thermal analysis apparatus DSC 50, manufactured by Shimadzu Corporation, 5 mg of a sample was treated under nitrogen gas flow in a manner such that temperature was raised from ambient temperature to 230° C. at a rate of 30° C./min, and immediately after reaching 230° C., the temperature was lowered to 50° C. at a rate of 5° C./min. From a crystallization peak detected at this stage, the crystallization temperature and the crystallization calorie were obtained.

Here, a peak top temperature (° C.) was taken as the crystallization temperature, and the crystallization peak calorie (J/g) was calculated from the area of a peak surrounded with a curve showing a calorie variation shifted to the base line. The above-mentioned curve includes any of a broad curve and a sharp curve. A straight line is drawn in parallel to the base line, and a point at which the resulting tangent is crossed with the curve showing a calorie variation is taken as the peak top temperature.

In the present invention, how to control the crystallinity is not limited. For example, there are a process comprising using an olefinic resin having high crystallinity, thereby obtaining the composition in accordance with the present invention, and a process comprising adding a crystallinity improving agent to an olefinic resin having low crystallinity, thereby obtaining the composition in accordance with the present invention.

Typical examples of the above-mentioned crystallinity improving agent are a crystal nucleating agent classified into a phosphoric acid ester type, a sorbitol type and a carboxylic acid salt type, and an inorganic filler.

Specific examples of the above-mentioned crystal nucleating agent are sodium 2,2'-methylenebis(4,6-di-t-butylphenyl)phosphate, bis(p-methylbenzylidene)sorbitol and bis(p-ethylbenzylidene)sorbitol. Specific examples of the above-mentioned inorganic filler are single substances such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide and their complexes (alloy), hydrates of an inorganic metal compound such as hydrates of aluminum hydroxide, magnesium hydroxide, dolomite, hydrotalcite, zeolite, calcium hydroxide, barium hydroxide, basic magnesium carbonate, zirconium hydroxide, zinc borate, zinc metaborate, barium metaborate, zinc carbonate, magnesium carbonate, calcium carbonate, barium carbonate, kaolin, montmorillonite, bentonite, clay, mica and talc. Of these, preferred are plate like fillers, and particularly preferred are talc, mica and kaolin.

The above-mentioned crystallinity improving agent is used in an amount of preferably from 0.01 to 200 parts by weight based on 100 parts by weight of the composition of (A) and (B). More preferable is from 0.1 to 150 parts by weight, the most preferable is from 0.1 to 100 parts by weight, and extremely preferable is from 0.1 to 50 parts by weight, based thereon.

Further, the composition in accordance with the present invention may contain other inorganic fillers, plasticizers, organic or inorganic pigments, heat stabilizers, antioxidants, ultraviolet absorbers, photo-stabilizers, flame retardants, silicone oil, anti-blocking agents, foaming agents, anti-static agents and anti-microbial agents as far as its characteristic features are not impaired.

In producing the composition in accordance with the present invention, there can be applied a conventional method using Banbury mixer, a kneader, a single screw extruder and a twin screw extruder, which have been used for the production of a usual resin composition and a usual rubber composition. Particularly, in order to attain dynamic cross-linking effectively, it is preferred to use a twin screw extruder. The twin screw extruder can serve more suitably to disperse (A) and (B) uniformly and finely and cause cross-linking reaction with the aid of other components, thereby continuously producing the composition in accordance with the present invention.

More specifically, the composition in accordance with the present invention can be produced through the following processing steps, which are given as preferred embodiments. That is, (A) and (B) are thoroughly blended and then fed into a hopper of an extruder. (C) may be added at the beginning together with (A) and (B), or may be added on the way into the extruder. Further, the softening agent (D) may be added on the way into the extruder. Alternatively, (D) to be added may be divided and added at the beginning and on the way. A part of (A) and (B) may be added on the way into the extruder. In the course of kneading under heat melting in the extruder, the cross-linking reaction is caused between the foregoing (A) and (C), and further by adding (D) thereto and melt-kneading it with one another, the cross-linking reaction and kneading dispersion are thoroughly conducted. Thereafter, the resultant is taken out of the extruder, and as a result, the composition in accordance with the present invention can be obtained in a pellet form.

In a particularly preferred melt extrusion method, there is used a twin screw extruder having a screw length of L from a material feeding port in the direction of a die and an L/D of from 5 to 100, wherein D is a diameter of a barrel. It is preferred that the twin screw extruder has several supplying port at more than one position, which supplying port include a main hopper and a side feeding port, which are different in their distance from the top portion of the extruder, and a kneading means between said several supplying port and between the top portion and the supplying port closest to the top portion, wherein respective kneading means have a length of from 3D to 10D.

The twin screw extruder which is one of production apparatuses used in the present invention may be a uni-directional rotating twin screw extruder or a multi-directional rotating twin screw extruder. With respect to a mesh of the screw, any of non-meshing type, partial meshing type and complete meshing type may be used. In order to obtain a uniform resin at a low temperature with a low shearing power applied, it is preferred to use a uni-directional rotating partial meshing type screw. When somewhat stronger kneading is required, a uni-directional rotating complete meshing type screw is preferred. When further stronger kneading is required, a uni-directional rotating complete meshing type screw is preferred.

The most preferred process for producing the composition in accordance with the present invention comprises melt-blending (A) and (B) with each other, and thereafter carrying out cross-linking with the aid of (C).

In the present invention, X and Y of (A) are defined as follows. Weight of (A), W0, in the rubber composition is measured in advance. Then, about 2 g of the rubber composition is accurately weighed, and refluxed for 20 hours in 200 ml of xylene. The resulting solution is filtered with a filter (cylindrical filter paper), and weight of a swollen composition, W1, is measured. Successively, the above-mentioned swollen composition is dried in vacuo at 100° C., and weight thereof, W2, is again measured. X and Y are calculated as follows.

$$X=(W2/W0)\times 100(\%)$$

$$Y=W2/W1$$

X and Y can be controlled by appropriately selecting the kind and amount to be added of the cross-linking initiator (C-1) and the cross-linking assistant(s) (C-2) and/or (C-3), a reaction temperature and a reaction manner. X can be increased with increase in the cross-linking initiator and the cross-linking assistant(s) and by carrying out the reaction at the lowest possible temperature not lower than a decomposition temperature of the cross-linking initiator for a long period of time. On the other hand, Y can be increased with increase in the polyfunctional monomer (C-2) having more functional group. In order to increase Y, it is preferred to decrease the monofunctional monomer (C-3) having radical polymerization ability. Both (C-2) and (C-3) are used at the same time, so that the reaction speed can be controlled. If the cross-linking initiator and the cross-linking assistant(s) are added in an excessive amount, both X and Y are increased together, and as a result, the requisites of the present invention cannot be satisfied. It is preferred that an amount ratio of (C-1)/(C-2)/(C-3) is within a range of 1/1 to 5/0 to 0.5. More preferable is within a range of 1/1 to 4/0 to 0.3, and the most preferable is within a range of 1/1 to 3/0 to 0.1.

Further, an excessively high active cross-linking initiator or cross-linking assistant(s), or high temperature reaction conditions result in increase in both X and Y, and as a result, the requisites of the present invention cannot be satisfied. When a small amount of the softening agent (D) is absorbed into (A) in advance, and then the cross-linking initiator and the cross-linking assistant(s) are blended with (A), the cross-linking reaction can proceed mildly, so that X can be increased while controlling increase of Y.

As a specific production process to attain X and Y in the present invention, for example, it is preferred to apply a process satisfying the following kneading degree M, $$M=(\pi^2/2)(L/D)D^3(N/Q)$$

$$10\times 10^6 \leq M \leq 1000\times 10^6$$

wherein L is a length of an extruder from a material feeding port in the direction of a die (mm), D is a barrel inner diameter of an extruder (mm), Q is an output (kg/h), and N is the rotating number of a screw (rpm).

As another specific production process to attain X and Y in the present invention, for example, it is preferred to satisfy a melting temperature of the following relation expression.

That is, in the first place, melt-kneading is carried out at a melting temperature of T2 (° C.), and successively carried out at a melting temperature of T3 (° C.). Particularly, in a melt extruder having a length L from a material feeding port in the direction of a die, in the first place, melt-kneading is carried out at a melting temperature of T2 (° C.) in an extruder zone within a length of from 0.1 L to 0.5 L from the material feeding port, and successively carried out at a melting temperature of T3 (° C.) in the remaining extruder zone.

Herein, T1 is particularly preferably from 150 to 250° C., and T1 and T2 of each zone in the melt extruder may be a uniform temperature or may have a temperature gradient.

T1: 1 minute half-life temperature of (C-1) (° C.)

$$T1-100<T2<T1+40$$

$$T2+1<T3<T2+200$$

How to add the softening agent (D) is important to attain X and Y in the present invention. As a specific production process, it is preferred that an extruder having one main hopper and more than one supplying port capable of side-feeding, which means are different from one another in distance from a top portion, is used, and (A), (B), (C) and (D) are melt-kneaded therein to perform dynamic vulcanization, wherein (D) to be fed is divided into more than one part and fed separately into the feeding port and the supplying port.

By feeding (D) separately, melt viscosity at the time of the dynamic vulcanization in the first half of the extruder decreases to control the reaction rate, and as a result, Y decreases. How to control Y can be determined by the division number of (D) or an amount to be added thereof.

The thus obtained olefinic rubber composition can be molded into various molded products in an arbitrary molding manner. Injection molding, extrusion molding, compression molding, blow molding, calendering and foaming can be suitably applied.

The present invention is explained in more detail with reference to Examples and Comparative Examples, which are not intended to limit the scope of the present invention. In these Examples and Comparative Examples, test methods used for the evaluation of various physical properties are as follows.

(1) X and Y

Weight of (A), W0, in the rubber composition is measured in advance. Then, about 2 g of the composition is accurately weighed, and refluxed for 20 hours in 200 ml of xylene. The resulting solution is filtered with a filter (cylindrical filter paper), and weight of a swollen composition, W1, is measured. Successively, the above-mentioned swollen composition is dried in vacuo at 100° C., and weight thereof, W2, is again measured. X and Y are thus calculated as follows.

$$X=(W2/W0)\times 100(\%)$$

$$Y=W2/W1$$

(2) Hydrogenation Ratio of (A)

It was measured in a conventional manner according to NMR.

(3) Vacuum-forming Moldability

A sheet of the composition having a thickness of 1 mm was prepared, and heated using an infrared heater until a surface of the sheet reached 140° C. Thereafter, the resulting sheet of the composition was brought into contact with a cuboid mold having a square bottom having a dimension of 15 cm×15 cm and a depth of 5 cm, and then molded under vacuum to obtain a molded product. Mold-reproducibility and transferability of the molded product obtained were visually evaluated on the basis of the following criteria.

⊚: Very good

○: Good

Δ: Good, but the mold-reproducibility and transferability at a corner portion is somewhat bad X: Bad On the other hand, using Capillograph 1C-3A manufactured by TOYO SEIKI SEISAKUSHO Co., Ltd. as a capillary meter, melt tension and melt elongation of the molten polymer are measured.

More specifically, a drawing speed is varied under conditions mentioned below, and melt tension is measured at each drawing speed. At that time, a drawing speed at which yarn breakage is observed is measured. This is an index of the melt elongation and corresponds to the vacuum-forming moldability.

land length: 10 mm, orifice caliber: 1 mm, melting temperature: 200° C., cross-head speed: 50 mm/min (4) Tensile Strength [MPa]

Using the sheet of the composition, it was evaluated at 23° C. according to JIS K6251.

(5) Appearance

A surface of the sheet obtained according to T die extrusion molding was observed to visually evaluate the appearance on the basis of the following criteria.

⊚: Very good

○: Good

Δ: Good, but somewhat sandy

X : Wholly sandy and no gloss (6) Oil Resistance

Weight of a sheet of the composition having a thickness of 2 mm, $W_0$, is measured in advance. Thereafter, the sheet of the composition is allowed to stand for 20 hours in liquid paraffin of 80° C. Then, the weight of the sheet of the composition, $W_1$, is measured, and a weight increasing ratio is calculated as follows. Here, the smaller the numerical value, the better the oil resistance.

$$\text{Weight variation rate}=(W_1-W_0)/W_0\times 100(\%)$$

Respective components used in Examples and Comparative Examples were as follows.

(a) Vulcanized Rubber (A)

1) Ethylene-α-olefin Copolymer a) Ethylene-propylene-ethylidenenorbornene (ENB) Copolymer (Referred to as TPE-1)

It was produced according to a method using a metallocene catalyst as described in JP-A-3-163088. A composition ratio of ethylene/propylene/ENB in the copolymer was 72/24/4 (weight ratio), and Mooney viscosity thereof was 100.

b) Ethylene-propylene-ethylidenenorbornene (ENB) Copolymer (Referred to as TPE-2)

It was produced according to a method using a usual Ziegler catalyst. A composition ratio of ethylene/propylene/ENB in the copolymer was 72/24/4 (weight ratio), and Mooney viscosity thereof was 105.

c) Ethylene-octene-1 Copolymer (Referred to as TPE-3)

It was produced according to a method using a metallocene catalyst as described in JP-A-3-163088. A composition ratio of ethylene/octene-1 in the copolymer was 72/28 (weight ratio), and Mooney viscosity thereof was 100.

(b) Olefinic Resin (B)

(1) Ethylene-propylene Random Copolymer Resin (Referred to as PP-1)

It was produced using a Ziegler catalyst according to EP 0969043A1 or U.S. Pat. No. 5,198,401. Flexural modulus of elasticity: 600 MPa.

(2) Ethylene-propylene Random Copolymer Resin (Referred to as PP-2)

It was produced using a metallocene catalyst according to EP 0969043A1 or U.S. Pat. No. 5,198,401. Flexural modulus of elasticity: 600 MPa.

(3) Homopolypropylene (Referred to as PP-3)

Isotactic homopolypropylene SUN-ALLOMER manufactured by Montell SDK Sunrise Ltd. Flexural modulus of elasticity: 1800 MPa.

(4) Block Polypropylene (Referred to as PP-4)

SUN-ALLOMER manufactured by Montell SDK Sunrise Ltd. Flexural modulus of elasticity: 1200 MPa.

(5) Low Density Polyethylene (Referred to as LDPE)

SUNTEC LD manufactured by Asahi Chemical Industry Co., Ltd. Flexural modulus of elasticity: 550 MPa.

(c) Cross-Linking Agent

1) Cross-linking Initiator (C-1)

2,5-Dimethyl-2,5-bis(t-butylperoxy)hexane (a commercial name of Perhexa 25B) manufactured by NOF Corporation) (hereinafter referred to as POX)

2) Polyfunctional Monomer (C-2)

Divinylbenzene manufactured by Wako Pure Chemical Industries, Ltd. (referred to as DVB)

3) Polyfunctional Monomer (C-2)

Triallyl isocyanurate manufactured by Nippon Kasei Chemical Co., Ltd. (referred to as TAIC)

4) Polyfunctional Monomer (C-2)

N,N-m-Phenylenebismaleimide manufactured by Ouchi Shinko Chemical Industry Co., Ltd. (referred to as PMI)

5) Monofunctional Monomer (C-3)

Methyl methacrylate manufactured by Asahi Chemical Industry Co., Ltd. (referred to as MMA)

(d) Paraffin Oil

DIANA process oil PW-90 manufactured by Idemitsu Kosan Co., Ltd. (referred to as MO)

EXAMPLES 1

As an extruder, a twin screw extruder (40 mmφ, L/D=47) having a feeding port at the center of a barrel was used. As the screw, a double-blade screw having kneading means in front of and behind the feeding port was used.

In the first place, components other than MO for a mixture of (A) TPE-1/(B) PP-3/(C-1) POX-1/(C-2) TAIC/(D) MO=65/35/0.3/0.6/45 (part by weight) were placed in the twin screw extruder, successively MO was introduced therein from the feeding port provided at the center of the extruder with the aid of a pump, and melt-extrusion was carried out at 220° C.

The thus obtained rubber composition was compression-molded at 200° C. to obtain a sheet having a thickness of 2 mm, and its mechanical characteristics were evaluated. The results are shown in Table 1.

Table 1 demonstrates that the composition satisfying requisites of X and Y in the present invention is superior in appearance, oil resistance, mechanical strength and vacuum-forming moldability.

EXAMPLES 2 TO 4 and COMPARATIVE EXAMPLES 1 TO 5

Kinds of the radical initiator and cross-linking assistants, amounts thereof, reaction temperature and a reaction manner were changed with reference to conditions in Example 1, thereby controlling X and Y. More specifically, for the purpose of increasing X, the radical initiator or the cross-linking assistants were increased, and moreover the reaction was carried out for a long period of time at the lowest possible temperature not lower than a decomposition temperature of the radical initiator. On the other hand, for the purpose of decreasing Y, it was necessary to control a reaction rate. For example, the radical initiator was decreased and the reaction was carried out at a low temperature. A small amount of MO was absorbed into TPE-1 in advance, and then POX, DVB and TPE-1 were blended. Thereby, X could be increased while controlling increase of Y.

The thus obtained rubber compositions were evaluated in a manner similar to that in Example 1. The results are shown in Table 1.

EXAMPLES 5 TO 9 AND COMPARATIVE EXAMPLE 6

As Examples 5 to 8, Example 1 was repeated, except that the component (B) in Example 1 was changed to those shown in Table 1. As Example 9, Example 3 was repeated, except that TPE-1 in Example 3 was changed to TPE-3. As Comparative Example 6, Example 3 was repeated, except that TPE-1 in Example 3 was changed to TPE-2. The results are shown in Table 1.

EXAMPLE 10 TO 13

Example 6 was repeated, except that the kind of the component (C) and the amount thereof were changed to those described in Table 2. The results are shown in Table 2.

TABLE 1

| | | Unit | Example 1 | Example 2 | Example 3 | Example 4 |
|---|---|---|---|---|---|---|
| Composition | Vulcanizable rubber (A) | | TPE-1 | TPE-1 | TPE-1 | TPE-1 |
| | Olefinic resin (B) | | PP-3 | PP-3 | PP-3 | PP-3 |
| State of cross-linking | Cross-linking degree X | % | 26 | 7 | 10 | 40 |
| | Cross-linking density Y | | 0.5 | 0.1 | 0.1 | 0.1 |
| Properties | Appearance | | ○ | ◎ | ◎ | ○ |
| | Oil resistance Weight increasing ratio | % | 68 | 83 | 75 | 61 |

TABLE 1-continued

|  |  |  |  |  |  |
|---|---|---|---|---|---|
| Tensile strength | MPa | 14.3 | 11.2 | 13.6 | 15.1 |
| Vacuum-forming moldability |  | ○ | ○ | ◎ | ◎ |
| Melt tension | g | 3.0 | 2.3 | 3.1 | 4.3 |
| Drawing speed at the time of yarn breakage | m/min | 38 | 53 | 45 | 42 |

|  |  | Comparative Example 1 | Comparative Example 2 | Comparative Example 3 | Comparative Example 4 | Comparative Example 5 |
|---|---|---|---|---|---|---|
| Composition |  | TPE-1 PP-3 | TPE-1 PP-3 | TPE-1 PP-3 | TPE-1 PP-3 | TPE-1 PP-3 |
| State of cross-linking Properties |  | 26 | 60 | 45 | 25 | 0 |
|  |  | 0.01 | 0.3 | 0.1 | 0.6 | 0 |
|  |  | ◎ | Δ | Δ | X | ◎ |
|  |  | 180 | 51 | 53 | 59 | dissolved |
|  |  | 7.6 | 16.3 | 15.8 | 15.2 | 3.6 |
|  |  | X | X | Δ | X | X |
|  |  | 1.5 | 4.5 | 4.4 | 3.9 | <1 |
|  |  | 17 | 19 | 37 | 21 | <5 |

|  | Example 5 | Example 6 | Example 7 | Example 8 | Comparative Example 6 | Example 9 |
|---|---|---|---|---|---|---|
| Composition | TPE-1 PP-1 | TPE-1 PP-2 | TPE-1 PP-4 | TPE-1 LDPE | TPE-2 PP-3 | TPE-3 PP-3 |
| State of cross-linking Properties | 24 | 23 | 25 | 31 | 8 | 8 |
|  | 0.4 | 0.4 | 0.4 | 0.5 | 0.08 | 0.09 |
|  | ◎ | ◎ | ○ | Δ | Δ | ◎ |
|  | 66 | 64 | 67 | 53 | 110 | 75 |
|  | 15.3 | 15.0 | 14.6 | 13.6 | 9.1 | 13.2 |
|  | ◎ | ◎ | ○ | ○ | Δ | ◎ |
|  | 2.8 | 2.9 | 3.0 | 3.2 | 2.6 | 3.1 |
|  | 47 | 45 | 39 | 34 | 17 | 46 |

TABLE 2

|  |  | Unit | Example 10 | Example 11 | Example 12 | Example 13 |
|---|---|---|---|---|---|---|
| Composition | Vulcanizable rubber (A) |  | TPE-1 | TPE-1 | TPE-1 | TPE-1 |
|  | Olefinic resin (B) |  | PP-2 | PP-2 | PP-2 | PP-2 |
|  | Cross-linking agent (C) |  |  |  |  |  |
|  | Kind of Cross-linking agent (C-1) |  | POX | POX | POX | POX |
|  | Amount added | wt % | 0.5 | 0.5 | 0.5 | 0.5 |
|  | Kind of Cross-linking agent (C-2) |  | DVB | PMI | TAIC | TAIC |
|  | Amount added | wt % | 1.0 | 1.0 | 1.0 | 0.5 |
|  | Kind of Cross-linking agent (C-3) |  | — | — | — | MMA |
|  | Amount added | wt % | — | — | — | 0.5 |
| State of cross-linking Properties | Cross-linking degree X | % | 27 | 28 | 29 | 17 |
|  | Cross-linking density Y |  | 0.20 | 0.30 | 0.45 | 0.30 |
|  | Appearance |  | ◎ | ○ | ◎ | ◎ |
|  | Oil resistance Weight increasing ratio | % | 78 | 68 | 57 | 93 |
|  | Tensile strength | MPa | 17.6 | 16.1 | 17.1 | 17.9 |
|  | Vacuum-forming moldability |  | ◎ | ◎ | ◎ | ◎ |
|  | Melt tension | g | 2.7 | 2.6 | 3.2 | 2.0 |
|  | Drawing speed at the time of yarn breakage | m/min | 40 | 37 | 43 | 28 |

What is claimed is:

1. A vulcanized thermoplastic olefinic rubber composition comprising at least one vulcanizable rubber (A) selected from the group consisting of ethylene-α-olefin copolymers, which contain an ethylene unit and a unit of an α-olefin having 3 to 20 carbon atoms, and which are produced with use of a metallocene catalyst, and an olefinic resin (B), wherein X and Y as defined below of said (A) are from 1 to 40% and from 0.2 to 0.5, respectively, $X = (W2/W0) \times 100 (\%)$ $Y = W2/W1$ wherein W1 is a weight of a swollen vulcanized rubber (A), which is obtained when (A) in an amount of W0 is extracted with hot xylene, and W2 is a weight measured after drying of the above-mentioned swollen vulcanized rubber (A).

2. The olefinic rubber composition according to claim 1, wherein the foregoing (B) is a propylene resin.

3. The olefinic rubber composition according to claim 1, wherein the foregoing (B) contains a propylene random copolymer resin, which has a flexural modulus of elasticity prescribed in JIS K6758 of from 10 to 1000 MPa, and which comprises propylene as a main constituent and an α-olefin(s) having 2 and/or 4 to 20 carbon atoms.

4. The olefinic rubber composition according to claim 1, wherein the foregoing (B) is a propylene resin produced with use of a metallocene catalyst.

5. The olefinic rubber composition according to claim 1, wherein a crystallization temperature and crystallization calorie according to a differential scanning calorimetry (DSC method) of the foregoing (B) are within a range of from 110 to 150° C., and within a range of from 30 to 200 J/g, respectively.

6. The olefinic rubber composition according to claim 1, which is vulcanized with the aid of a cross-linking agent (C).

7. The olefinic rubber composition according to claim 1, which further comprises a softening agent (D).

* * * * *